UNITED STATES PATENT OFFICE.

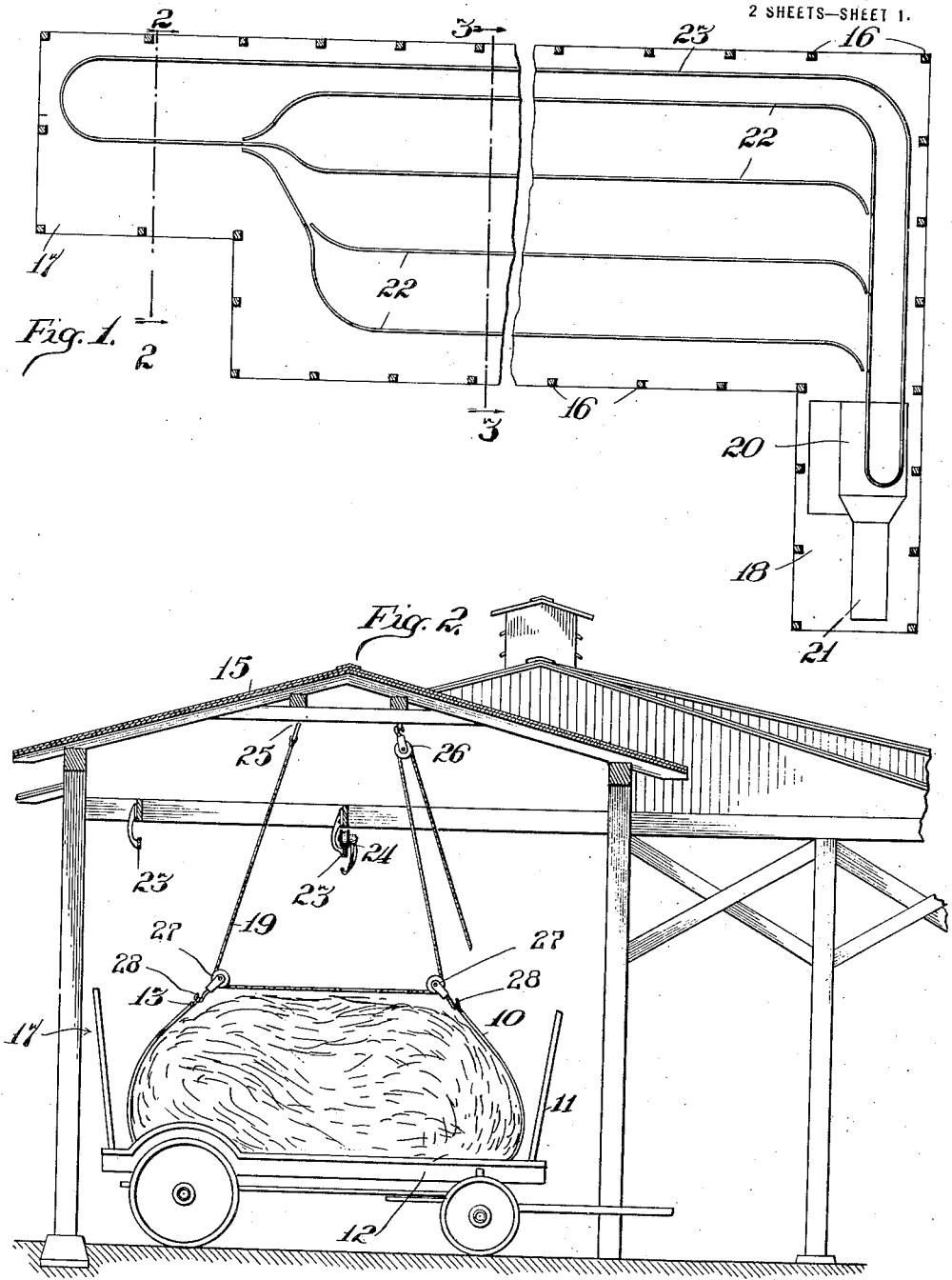

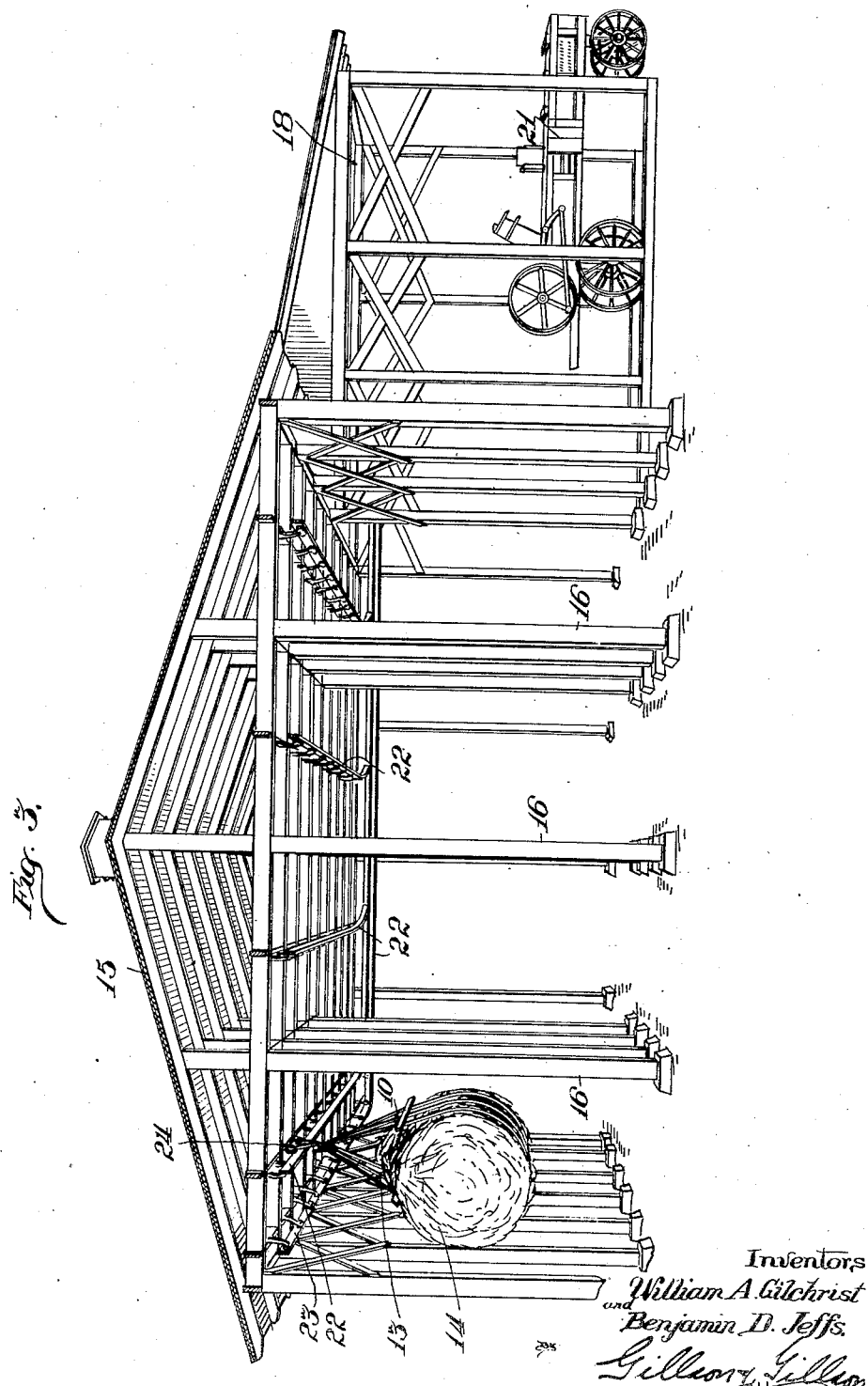

WILLIAM A. GILCHRIST, OF NEW YORK, N. Y., AND BENJAMIN D. JEFFS, OF BERWYN, ILLINOIS.

METHOD AND APPARATUS FOR CURING ALFALFA AND THE LIKE.

1,368,134. Specification of Letters Patent. Patented Feb. 8, 1921.

Application filed September 21, 1918. Serial No. 255,092.

*To all whom it may concern:*

Be it known that we, WILLIAM A. GILCHRIST and BENJAMIN D. JEFFS, citizens of the United States, and residents, respectively, of New York, county and State of New York, and Berwyn, county of Cook, and State of Illinois, have invented certain new and useful Improvements in Methods and Apparatus for Curing Alfalfa and the like, of which the following is a specification, and which are illustrated in the accompanying drawings, forming a part thereof.

The invention relates to the harvesting of alfalfa and the like and is especially applicable for use in localities where uncertainties of the weather render it advisable to gather the crop immediately after it is cut. On the other hand, the crop cannot be stored without first being cured and the green crop contains such a large proportion of moisture that drying it by artificial heat is wholly impracticable.

It has been found that a large proportion of the nutrient contituents of alfalfa, particularly those which are of value in promoting the growth of young stock, is contained in the leaves. Furthermore, if rain occurs while the crop is lying on the ground, after being cut, the leaves become withered and discolored when the crop is subsequently dried by the sun. The value of the crop is thus very much impaired, both because of increased loss of the leaves in handling and because important nutrient constituents of those which are retained have been destroyed. Wetting of the crop when it has been collected in bunches or cocks is likewise injurious and often requires additional handling to avoid total loss.

The principal objects of the invention are to facilitate the harvesting of alfalfa, to reduce the labor of handling the same and the leaf loss resulting therefrom, to insure against injury to or loss of the crop by exposure to unfavorable weather both when it is first cut and while curing, and to enhance the value of the crop when cured. To this end the invention contemplates an improved method and apparatus for curing alfalfa and the like, whereby the crop is wholly protected from the rain and direct exposure to the sun from immediately after it is cut until fully cured ready for baling, and the desirable green color of the fresh crop is substantially retained in the cured product.

In the accompanying drawings—

Figure 1 is a plan view showing in diagram a form of building which may be employed in connection with the use of the invention;

Fig. 2 is a transverse sectional view showing the building and some of the contained apparatus from the plane indicated by the line 2—2 on Fig. 1; and Fig. 3 is similar to Fig. 2 but is drawn in perspective and shows the parts as viewed from the plane indicated by the line 3—3 on Fig. 1.

In carrying out the improved process it is proposed that the green crop may be gathered and removed from the meadow immediately after it is cut. The gathering and loading of the crop will be accomplished with any of the forms of hay rakes and loaders now in common use and these are not shown in the drawings. To permit the curing of the crop in accordance with the proposed plan the crop is preferably loaded upon slings, one of which is represented at 10, Figs. 2 and 3. The slings may also be of well known construction and of a form now in common use to facilitate the transfer of hay without loss from a rack or wagon to a loft or stack. As usual, each of the slings 10 will be of such size that when laid upon the rack 11 of a hay wagon, as 12, in advance of loading the same, it may be subsequently extended about the entire load or a suitable fraction of the same. For this purpose the sling is desirably equipped at its opposite ends with loops or rings 13—13 for connection with hoisting apparatus.

It is proposed that each wagon load of the crop is to be retained in one or more of the slings, as 10, throughout the period of curing. The crop is thereby separated into relatively large bundles, one of which is represented at 14, Fig. 3. A large number of the slings 10 are accordingly to be provided, and provision is also made for suspending the slings with their contained bundles 14 under the roof, as 15. As shown, the roof 15 is supported upon posts 16, forming a shed which preferably has open sides. This shed may be employed to contain all of the crop which may be harvested from a given meadow or group of meadows, during curing, and this may require several weeks' time. The shed will accordingly vary in size in proportion to the size of the farm upon which it is used but it will preferably be of considerable length in any case and it is desirably constructed with extensions or wings, as 17 and 18. In the form illustrated, the wing 17 is located at one end of the shed and is equipped with hoisting apparatus, generally designated 19. The wing 18, on the other hand, extends from one side of the shed near that end of the same which is remote from the wing 17 and is equipped with a receiving hopper 20 and a baling press, conventionally represented at 21.

Under the roof 15 and extending substantially throughout the length of the same is a series of elevated tracks 22. At the opposite ends of the shed, all of the tracks 22 unite with a return track 23 which extends into the wings 17 and 18, forming a continuous circuit. Throughout the curing period, each sling 10 with its contained bundle 14 of the crop is suspended from a trolley, as 24, which runs upon the tracks 22 and 23.

The hoist 19 serves for raising the slings 10 from the corresponding wagons, as 12, for engagement with one of the trolleys 24. Any convenient form of hoist may be employed for this purpose. The one shown comprises a simple loop of rope having one end fastened to the roof 15, as at 25, Fig. 2, the other end of the rope being passed over an elevated sheave 26 and extended to a hoisting engine, not shown. Two pulleys 27, each equipped with a hook 28, run upon the hoisting rope between the fixed end 25 of the rope and the sheave 26.

As each wagon load of the crop is brought from the meadow, it is drawn into the wing 17 beneath the hoist 19. The hooks 28 of the two pulleys 27 are then engaged with the looped ends 13 of the corresponding sling 10 and the sling with its contained load is elevated until its loops may be engaged with one of the trolleys 24. The hoist is then disengaged from the sling and by movement of the trolley 24 along the track 23 and onto one of the tracks 22, the bundle 14 of alfalfa contained in the sling is moved from the wing 17 into the main part of the shed, under the roof 15. As other bundles of the crop are brought to the shed those preceding will be advanced in the shed by movement of the corresponding trolleys along the tracks 22. Throughout the period during which each bundle, as 14, of the crop remains suspended within the shed, it is exposed to a free circulation of air upon all sides, but it is protected from the rain and from direct exposure to the sun. The curing accordingly proceeds gradually and the crop substantially retains its original green color. Furthermore, the curing is not accompanied by any handling of material which would cause loss of the leaves.

When each bundle, as 14, has been completely cured the corresponding trolley 24 is moved from one of the tracks 22 onto the return track 23 and along the same into the wing 18 over the receiving hopper 20. The contents of the sling is then delivered upon the receiving hopper 20 by releasing one of the looped ends 13 of the sling from the trolley 24. From the hopper 20 the product is fed to the baling press 21. This may be accomplished by hand in a well known manner.

When the apparatus of the form illustrated is employed to serve a group of meadows and several crops of alfalfa are harvested during the season, the harvesting of the several meadows may proceed continuously throughout the season. That is to say, the time which elapses between the gathering of different crops from the same meadow will ordinarily be sufficient for the curing of a crop. During that time the crops from other meadows may be harvested and collected into bundles for curing, while baling of each crop will have begun when a new crop is to be harvested from the same meadow.

While the invention contemplates that the green crop may be gathered and removed from the meadow immediately after it is cut, it will be understood that in event the weather conditions are such as to permit, it may be desirable to allow the green crop to lie two or three hours after being cut, as the evaporation of moisture will proceed rapidly during that time and less moisture will remain to be evaporated after the crop has been gathered and collected into the bundles, as 14.

We claim as our invention—

1. The method of curing alfalfa and the like which consists in collecting the green crop into bundles immediately after cutting and suspending the bundles in slings from an elevated track for gradual movement along the same while exposed to free circulation of air upon all sides and protected from the rain and direct exposure to the sun until cured.

2. Apparatus for curing alfalfa and the like comprising, in combination, a plurality of hay slings, a continuous elevated track, trolleys movable along the track in a circuit, hoisting apparatus for elevating the loaded slings to the trolleys at one part of the circuit, and baling apparatus at a different part of the circuit.

3. Apparatus for curing alfalfa and the like comprising, in combination, a plurality of hay slings, a continuous elevated track, trolleys movable along the track in a circuit, hoisting apparatus for elevating the loaded slings to the trolleys at one part of the circuit, baling apparatus at a different part of the circuit, and a roof covering the track throughout the circuit.

4. Apparatus for curing alfalfa and the like comprising, in combination, a plurality of hay slings, a tubular open frame fitting within the load of each sling, a continuous elevated track, trolleys movable along the track in a circuit, hoisting apparatus for elevating the loaded slings to the trolleys at one part of the circuit, and baling apparatus at a different part of the circuit.

5. The method of curing alfalfa and the like which comprises collecting the green crop into bundles, suspending the bundles in slings from an elevated track for gradual movement along the same while protected from rain and direct sunlight and exposed on all sides to free circulation of air at the normal temperature, until cured, moving the bundles of cured hay to a point over a hay baler, delivering the hay to the baler by gravity and baling the same.

WILLIAM A. GILCHRIST.
BENJAMIN D. JEFFS.